3,046,106
IRON ORE REDUCTION WITH COKE
Charles E. Hemminger, Westfield, N.J., and Edwin R. Gilliland, Arlington, Mass., assignors to Esso Research and Engineering Company, a corporation of Delaware
Filed June 22, 1960, Ser. No. 37,974
4 Claims. (Cl. 75—36)

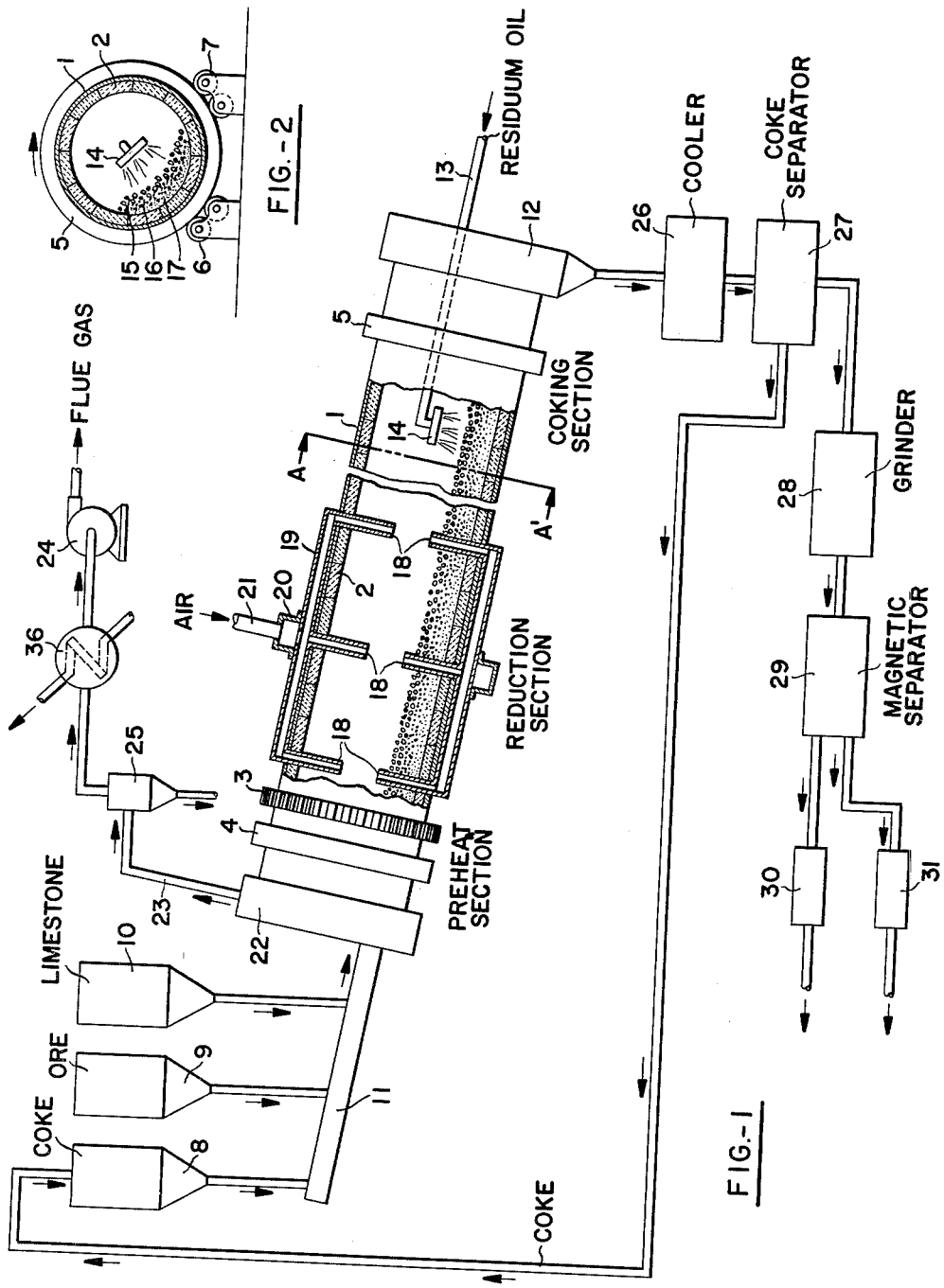

This invention relates to a process for direct reduction of ore particles in a rotary kiln operation using as a solid reductant petroleum coke formed in a coking section of the kiln.

The operation of a rotary kiln for reduction of iron ore has been known to involve feeding a charge mixture of carbon in the form of coal or coke fines with iron ore and limestone particles into the upper end of the kiln to travel countercurrently to hot combustion gases. To form the combustion gases, the kiln has been directly fired wtih gas or volatile oil at the lower opposite end serving as a combustion chamber. The discharged mixture, thus leaving the kiln has been at high temperature and has required quenching for removal of a large amount of heat, mostly dissipated, before being subjected to separation steps.

An improvement is made in accordance with the present invention by providing the kiln with a heavy mineral oil coking section where coke and fuel gas are formed beneficially from otherwise wasted heat of the reduction product and with other advantages that will be pointed out.

The operations including the new features of the invention will be described with reference to the drawing.

In FIG. 1 of the drawing is shown a schematic longitudinal view of the kiln in elevation and partly in cross-section with accessories.

In FIG. 2 is shown a vertical cross-section of the kiln at A—A'.

The rotary kiln comprises a steel cylinder 1 lined with refractory brick 2. It is inclined slightly from horizontal and rotates about its longitudinal axis. The kiln is from 6 to 12 feet in diameter and its length is about 20 times its diameter.

Rotation is obtained through a girth gear 3 driven at a peripheral speed of 25 to 40 ft./min., or other speeds needed. The kiln is supported on girth rings 4 and 5, each moving on dual rollers 6 and 7.

The charge of coke, ore fines, and limestone from hoppers 8, 9 and 10 are passed through an inclined chute 11 into the upper end of the kiln. The solids move down the sloping rotating kiln, and the solids product is discharged at the lower end into hopper bin 12, which has a sliding seal with the discharge end of the kiln.

Iron ore to be used in the charge is crushed and sized in the range of 0.5 inch to 0.01 inch, depending on the kind of ore, and may contain 25% to 50% or more Fe. The coke particles are to some extent both larger and finer and added in amounts several times the theoretical amount for reacting with the iron oxide. The limestone fines are added in amounts of about 10 to 20% or more of the ore.

As the solids charge travels down through the kiln, the ore is preheated in a preheat section at the upper end and then reduced in the reduction section intermediate the preheat and a coking section at the other end. The coking section is where the coke and fuel gases are formed by spraying heavy oil, e.g. petroleum residue from oil inlet pipe 13 and spray head 14 on to the hot coke that forms an upper layer 15 of coarse particles on reduced ore particles and slag of intermediate size in layer 16 above fine coke particles 17 as shown in FIG. 2.

The heavy oil, e.g. petroleum residue of lower than 20 A.P.I. gravity may be preheated to a moderate temperature, e.g. 100 to 300° F. for aiding flow and spraying. Spraying of the oil in the absence of air has been found opportune for making the oil promptly form a coke deposit on the top layer coke particles and simultaneously evolve high heating value gases, hydrogen and gaseous hydrocarbons. At the same time, heat is absorbed by this decomposition reaction from the solids and the reduced ore particles are given added protection against reoxidation.

To make the coking more effective, somewhat more coke is charged and of coarse size, such coke being obtained by separation from the discharged solids and recycling in a conventional manner, as will be later described. Any small amount of coke deposit on the reduced ore particles is not detrimental since it is useful in subsequent processing especially in ore benefaction.

The fuel gases from the coking are made to flow toward the reduction and preheat sections for combustion with air above the solids.

Various means can be employed for introduction of air in controlled amounts at several points. The method illustrated operates by sucking air through inlet ports 18 projecting into the kiln. A bustle manifold 19 having a sliding seal connection 20 to air inlet pipe 21 may be used. Other suitable practices may be used. Suction on the air is obtained from induced draft. The inlet ports 18 are preferably made to direct the air in the general direction of the gas stream flow.

The hot exhaust gases are withdrawn from the upper end of the kiln through chamber 22 having a sliding seal on the upper end of the kiln, and duct 23, to exhaust blower 24. A dust knockout or separator 25 and waste heat recovery means 36, etc. may be placed in the path of the gases.

As the solids pass slowly down through the kiln, the coarse coke particles form a top layer which protects the ore particles from oxidation while the solids are heated to the reduction temperature by radiation and conduction, the hot combustion gases being at 1800 to 2000° F. The top or upper layer coke particles undergo reaction with some of the oxygen of the air, carbon dioxide and $H_2O$ vapor and make the gas contain mostly $N_2$, CO and $H_2$ in the reduction section, wherein the ore particles undergo reduction, changing to magnetite ($Fe_3O_4$) from $Fe_2O_3$, then to FeO and Fe.

The reduction can be carried out to any desired degree, e.g. to obtain principally magnetic roasting (to $Fe_3O_4$) or above 80% metallization.

As the solids move into the coking zone they undergo some cooling, for example showing a temperature drop of 400° to 800° F., or more, and the heat removed from the solids is valuably utilized in forming the combustible gases that flow countercurrently to the solids.

The solids products discharged into bin 12 are then subjected to further cooling in unit 26 and separation in separator 27 using known techniques for separating the lower density coke pellets and finer particles. The separated coke may be cleaned and dried and recycled to hopper 8 for reuse.

The metallized ore may be fed to a grinder 28, and the ground particles of reduced ore can then be subjected to further separation, magnetic or gravity in unit 29 to concentrate the metallized ore. Different separated concentrates may then be briquetted in units 30 and 31.

During the reduction, the limestone acts to lower the sulfur content of the reduced ore. Dolomite or lime may be used similarly. The coke may be limed. Other impurities, e.g. phosphorus, silica, alumina, titanium and manganese are also removed from the ore in the operation.

It has been demonstrated that heavy petroleum residual oils sprayed as liquid streams on to preformed coke particles, such as form the top layer of the solids moving out from the reduction section of the rotary kiln rapidly undergo decomposition at the temperatures prevailing, e.g. 1600 to 1800° F. as the liquid oil contacts the moving coke particles to form a carbonized deposit on the coke particles and evolve a gaseous decomposition product rich in hydrogen. This coating of the upper layer coke particles takes place rapidly so that coke particles thickened by their added coke coating do not lump together substantially. Volatile matter in the coke coating is driven out rapidly under these coke coating conditions so that the resulting coke particles in moving toward the discharge end of the kiln can be made to have a volatile matter content (at 1000° F.) that is suitably low, e.g. less than 10 wt. percent in less than 20 minutes. The discrete coke particles of pebble size by accretions of coke deposit have a diameter of 0.1 to 1.0 inch or larger. Since a portion of the coke is consumed in the reduction zone to produce reducing gases and the particle size reduced thereby, there is no continual build up of particle diameters and an equilibrium average size is attained.

Steps used for providing improvement features on forming pebble size coke particles in a rotary kiln reduction of iron are set forth in the following example:

*Example*

A low grade hematite (40% Fe) to be beneficiated is crushed and sized in the range of 0.02 to 0.5 inch diameter. The sized ore mixed with limestone fines for sulfur removal and with a major wt. proportion of recycled petroleum residue coke pellets of mostly 0.1 to 1 inch size is fed into the upper end of a rotating cylindrical inclined kiln. The solids charge is made to travel countercurrently to hot gases which exit from the upper end of the kiln at near to 700° F. The kiln slope and rotation are controlled to make the solids form a layered bed having a segment shape as shown in FIG. 2. A bottom layer of this bed is made to contact the kiln brick wall mainly at a bottom arc off-center in the direction of rotation. This bed as it moves is made to keep a top layer of less dense coke pellets exposed to hot gases, the ore particles mainly in an intermediate layer and a relatively small amount of coke fines in the bottom layer.

The solids may be initially more heterogeneously mixed as they start to be preheated but form the layered bed as they progress toward the reduction section in the central portion of the kiln and where the countercurrent stream of gases is at temperatures of 1800° to 1950° F. Thus, the solids traveling through the preheat section are brought up to a temperature of 1700° to 1800° F. after passing through approximately 30 to 50% of the kiln length and some reduction of the ore takes place. As the layered charge travels through the reduction zone section which is the next 30 to 40% of kiln length, the temperature of the solids is kept mostly in the range of 1850° to 1950° F. with the adjacent counter-current flowing streams of gases at 40 to 50° F. higher. The layered bed charge then is passed through the coking zone section where heavy petroleum liquid residuum is sprayed over and contacted with the upper layer coke pellets to add coke coating to these pellets and form an adjacent $H_2$ and hydrocarbon gas rich stream having a temperature in the range of 800° to 1600° F., i.e., before this stream becomes mixed with air proportioned to react with part of the combustible $H_2$ and hydrocarbon gases passing from the coking zone to the reducing zone.

The layered solids having a top layer of coke pellets with added coke deposits pass through the final coking zone section which is 10 to 20% of total kiln length, to the lower discharge end of the kiln. The solids discharged from the kiln have a temperature in the range of approximately 800° to 1200° F. Then a substantial proportion of coke pellets are separated by screening for recycling. Finer coke particles are separated by elutriation with flue gas if desired or other methods. A magnetic ore product containing 75 to 90% iron is separated.

While the ore reduction can be effected by residuum alone as already described, the residuum oil can also be used to supplement other feeds as extraneous coal or coke. Then, these solid fuels are added with the recycle coke in hopper 8.

To maintain a ratio of coke to hydrocarbon gases in vapors in the kiln so that there is sufficient coke for mixing with the ore in line 11 and no excess gaseous hydrocarbons to burn with the air introduced in ports 18, the residuum oil feed composition and rate can be controlled in accordance with its coke-forming properties.

The Conradson carbon is a regular inspection on a residuum oil and roughly represents the amount of coke which will be formed. For operations with the residuum alone, the Conradson carbon is between 20 and 35% depending on the character of the charge and the degree of reduction desired. For the same reasons of variation in analysis of the feed iron ore and the depth of reduction desired the ratio of oil to ore will vary from 0.5 to 4 barrels per ton of ore. When extraneous coke or coal is fed, the oil to ore ratio is accordingly reduced. Also, the Conradson carbon requirement is decreased to, say, 5 to 10% carbon. Lower sulfur oils, less than 2% are preferred so that the limestone consumption is held to a minimum.

The invention is not limited to the operations disclosed. For example, when reducing the ore only for concentration for magnetic separation, the limestone may be omitted. Also, other ores can be reduced with the same technique.

What is claimed is:

1. In a process of reducing iron ore fines with coke moved as a solids bed continuously along a rotating cylindrical wall which receives heat from a stream of gases undergoing combustion superadjacent to the bed flowing counter-currently to the solids bed that passes from a preheating zone then through a reducing zone at iron oxide reducing temperatures, the improvement which comprises maintaining a top layer of coke pellets above finer ore particles in said solids bed passing through the reducing zone, passing the thus layered bed from the reducing zone into a coking zone, spraying heavy hydrocarbon liquid oil over said coke pellets of the top layer to form a coke deposit on said pellets and evolve hot combustible gas containing $H_2$ and hydrocarbon gases, removing reduced ore fines and coke that become cooled as they are moved through the coking zone, discharging the combustible gas containing hydrogen and hydrocarbons evolved in said coking zone into said reduction zone, introducing a free-oxygen-containing gas into said combustible gas downstream from said coking zone to convert carbonaceous materials principally to CO and evolve heat to effect reduction of the iron oxide by direct contact therewith and discharging the hot gaseous products from said reduction zone into said preheating zone whereby said hot gaseous products serve to preheat the solid materials supplied to said preheating zone.

2. The process as in claim 1 wherein coke pellets having added coke deposits from the coking zone are separated from reduced ore particles and recycled for use with fresh ore particle charge to the preheating zone.

3. The process as defined in claim 1 wherein the hydrocarbon oil sprayed on the upper coke pellet layer is a petroleum residual oil having an API gravity below 20.

4. The process as defined in claim 1 wherein air is drawn into the stream of combustible gases flowing from the coking zone to the reducing zone to supply said oxygen containing gas and at spaced points for partial combustion of the combustible gas so as to form the stream rich in CO.

References Cited in the file of this patent

UNITED STATES PATENTS

| | | |
|---|---|---|
| 891,705 | Jones | June 23, 1908 |
| 1,771,971 | Trent | July 29, 1930 |
| 2,064,715 | Atwell | Dec. 15, 1936 |
| 2,593,398 | Kalling | Apr. 22, 1952 |
| 2,829,042 | Moklebust | Apr. 1, 1958 |
| 2,877,108 | Smith | Mar. 10, 1959 |